(12) United States Patent
Hickenboth et al.

(10) Patent No.: US 9,610,741 B2
(45) Date of Patent: Apr. 4, 2017

(54) METHODS FOR PREPARING CUSTOMIZED POLYMERIC ARTICLES

(71) Applicant: PPG Industries Ohio, Inc., Cleveland, OH (US)

(72) Inventors: Charles R. Hickenboth, Cranberry Township, PA (US); Matthew J. Kryger, Pittsburgh, PA (US); Federico Menta, Parma (IT); Keith M. Cross, Holden, MA (US); David L. Lusher, II, Cheswick, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 120 days.

(21) Appl. No.: 14/571,691

(22) Filed: Dec. 16, 2014

(65) Prior Publication Data

US 2015/0165702 A1    Jun. 18, 2015

Related U.S. Application Data

(60) Provisional application No. 61/917,065, filed on Dec. 17, 2013.

(51) Int. Cl.
| | |
|---|---|
| *B29D 11/00* | (2006.01) |
| *G02B 1/04* | (2006.01) |
| *B29C 35/02* | (2006.01) |
| *B29C 35/08* | (2006.01) |
| *B29C 33/38* | (2006.01) |
| *B29C 33/42* | (2006.01) |
| *B29K 101/10* | (2006.01) |
| *B29K 101/12* | (2006.01) |
| *B29C 37/00* | (2006.01) |

(52) U.S. Cl.
CPC ........ *B29D 11/00557* (2013.01); *B29C 33/38* (2013.01); *B29C 33/42* (2013.01); *B29C 35/02* (2013.01); *B29C 35/0805* (2013.01); *B29C 37/0053* (2013.01); *B29D 11/00086* (2013.01); *G02B 1/041* (2013.01); *B29C 35/0222* (2013.01); *B29C 35/0888* (2013.01); *B29C 37/005* (2013.01); *B29C 2035/0827* (2013.01); *B29C 2035/0833* (2013.01); *B29C 2791/004* (2013.01); *B29K 2101/10* (2013.01); *B29K 2101/12* (2013.01)

(58) Field of Classification Search
CPC . B29C 35/02; B29C 35/0805; B29C 37/0053; B29C 2035/0827; B29C 2035/0833; B29C 2791/004; B29C 35/0222; B29C 35/0888; B29C 37/005; B29D 11/00557; G02B 1/041; B29K 2101/10; B29K 2101/12
USPC ....... 526/308, 329.7; 264/1.36, 405; 528/44, 528/370, 380, 421
See application file for complete search history.

(56) References Cited

U.S. PATENT DOCUMENTS

| | | | |
|---|---|---|---|
| 6,467,904 B1 | 10/2002 | Gartley et al. | |
| 2005/0056953 A1 | 3/2005 | Hofmann et al. | |
| 2012/0225252 A1* | 9/2012 | Lamprecht | B29C 33/38 428/156 |
| 2013/0122129 A1 | 5/2013 | Wang | |

* cited by examiner

*Primary Examiner* — Ling Choi
*Assistant Examiner* — Chun-Cheng Wang
(74) *Attorney, Agent, or Firm* — The Webb Law Firm

(57) ABSTRACT

The present invention provides a method for preparing a customized polymeric article including: providing two mold half-sections, each half-section having an outer surface and an inner surface; assembling the two mold half-sections to form a mold assembly such that the inner surfaces define a cavity there between; applying one or more magnetic fluids to the inner surface of a mold half-section; inserting a fluid polymeric material into the cavity; controllably applying a magnetic field to the magnetic fluids to form a customized reversible surface in accordance with a predetermined specific surface topography; subjecting the mold assembly to conditions sufficient to effect polymerization or hardening of the fluid polymeric material; and separating the two mold half-sections. Articles prepared by the method also are provided.

19 Claims, No Drawings

METHODS FOR PREPARING CUSTOMIZED POLYMERIC ARTICLES

CROSS-REFERENCE TO RELATED APPLICATION

This application claims the benefit of priority from U.S. Provisional Application No. 61/917,065, filed Dec. 17, 2013, which is incorporated herein in its entirety.

FIELD OF THE INVENTION

The present invention is directed to a method of preparing a customized polymeric article through the use of magnetic fluids.

BACKGROUND OF THE INVENTION

The molded polymeric article market is similar to several other markets in that it is trending towards customization and/or personalization. Moreover, there is a need to reduce production costs and provide molds that can be easily recycled or reused.

For example, the optical market is trending toward personalization of lenses. For example, digital surfacing technology allows for the potential to customize lenses to each individual's anatomical and optometric parameters, as well as other highly individualized measurements. It also allows lenses to take into account frame positioning; for example a lens shape can be created to allow for non-standard mounting (see https://www.bbgr.com/en-us/ensavoirplus/optique/Paqes/LeSurfa%C3%A7ageDigital.aspx). However, there are several disadvantages to creating lenses via digital surfacing. For example, since the process is based on the removal of lens material from a lens blank which is formed in the process, the process is wasteful and inefficient. It has been calculated that the digital surfacing of a typical lens from a blank to finished lens results in 50% or more of the lens material being cut away. The cut away material cannot be reused or recycled and, therefore, results in large amounts of landfill waste. It is, therefore, desirable to produce new methods of producing highly customized lenses which do not result in large amounts of waste.

One example of producing highly customized polymeric articles that meet the above requirements is to customize the mold surface such that a highly customized, finished article is obtained directly from the mold. However, since polished glass molds are expensive, it would be prohibitively expensive to make molds for every possible customized configuration in a traditional manner.

While it has been reported that polymeric articles, e.g., lenses, have been prepared using 3-dimensional printing processes, however, additive manufacturing processes are limited in the selection of polymeric resins that might be used.

The method of the present invention offers the ability to produce polymeric articles having specific customization features which are made using commonly known and industry acceptable polymeric materials. Further, it has now been found that the alternative approach of using a polymeric article casting process in which one or both mold surfaces is highly customizable and reusable allows for the production of highly customized articles, e.g., lenses and other transparencies, with high optical surface quality, while the molds can be easily recycled or reused.

SUMMARY OF THE INVENTION

The present invention is directed to a method for preparing a customized polymeric article comprising:
(a) providing two mold half-sections, each half-section having an outer surface and an inner surface;
(b) assembling the two mold half-sections to form a mold assembly such that the inner surfaces of the two mold half-sections oppose one another, thereby defining a cavity therebetween;
(c) prior to or subsequent to (b), applying one or more magnetic fluids to the inner surface of at least one mold half-section;
(d) inserting a fluid polymeric material into the cavity formed in (b);
(e) prior to or subsequent to (d), controllably applying a magnetic field to the one or more magnetic fluids to form a customized reversible surface in accordance with a predetermined specific surface topography;
(f) subjecting the mold assembly containing the fluid polymeric material to conditions sufficient to effect at least partial polymerization or hardening of the fluid polymeric material; and
(g) separating the two mold half-sections to provide a polymeric article having at least one surface corresponding to the predetermined specific surface topography of the magnetic fluid.

A polymeric article prepared by the above-described method also is provided.

DETAILED DESCRIPTION OF THE INVENTION

As previously mentioned, the present invention is directed to a method for preparing a customized polymeric article comprising:
(a) providing two mold half-sections, each half-section having an outer surface and an inner surface;
(b) assembling the two mold half-sections to form a mold assembly such that the inner surfaces of the two mold half-sections oppose one another, thereby defining a cavity therebetween;
(c) prior to or subsequent to (b) applying one or more magnetic fluids to the inner surface of at least one mold half-section;
(d) inserting a fluid polymeric material into the cavity formed in (b);
(e) prior to or subsequent to (d), controllably applying a magnetic field to the one or more magnetic fluids to form a customized reversible surface in accordance with a predetermined specific surface topography (or geometry);
(f) subjecting the mold assembly containing the fluid polymeric material to conditions sufficient to effect at least partial polymerization or hardening of the fluid polymeric material; and
(g) separating the two mold half-sections to provide a polymeric article having at least one surface corresponding to the predetermined specific surface topography of the magnetic fluid.

The one or more magnetic fluids can be selected from any magnetically susceptible fluids known in the art. In a particular embodiment, the one or more magnetic fluids can be selected from the group consisting of ferrofluids and magnetorheological ("MR") fluids. Ferrofluids are stable colloidal suspensions of nanoscale ferromagnetic or ferrimagnetic particles suspended in a carrier fluid which typically contains a surfactant which prevents particle agglomeration even when a strong magnetic field is applied to the ferrofluid. The surfactant must be matched to the carrier type and must overcome the attractive van der Waals and magnetic forces between the particles. Generally, a typical ferrofluid can contain by volume 5% magnetic solid, 10% surfactant, and 85% carrier fluid. Non-limiting examples of surfactants can include fatty acids such as oleic acid, linoleic, stearic or isostearic acid, hydroxides, such as tetramethylammonium hydroxide, citric acid or salts thereof, amines, alcohols, and/or soy lecithin. Choice of surfactant is dependent on the end use of the ferrofluids employed and whether the carrier fluid is an aqueous or an organic solvent. Suitable polar carrier fluids can include, for example, water or ethylene glycol. Oil based carrier fluids can include, for example, hydrocarbons such as poly(alpha olefins), polyol esters, silicones, perhalogenated (e.g, perfluorinated) oils and solvents, as well as halosilanes. In one embodiment, the ferrofluid is a perhalogenated ferrofluid. There are generally two major steps in preparing a ferrofluid. The first is to make the magnetic nanoparticles (approximately 100 Angstroms diameter, about 10 nm) that will be dispersed in the colloidal suspension. The magnetic particles in ferrofluids useful in the method of the present invention are generally magnetite ($Fe_3O_4$), although other magnetic particles such as maghemite and hematite may be employed as well as other magnetic particles, such as cobalt and nickel-containing particles. Further contemplated are alloys and other magnetic elements. In the second step of preparing ferrofluids, the magnetic particles are dispersed in a carrier liquid by utilizing a suitable surfactant to create a colloidal suspension as discussed above.

The difference between ferrofluids and MR fluids is the size of the particles. As mentioned above, the particles in a ferrofluid primarily consist of nanoparticles which are suspended by Brownian motion and, generally, will not settle under normal conditions. By contrast, MR fluid particles primarily comprise micrometer-scale particles which may be too heavy for Brownian motion to maintain suspension and, thus, may settle over time. Also, MR fluids can gel or solidify in the presence of a magnetic field. MR fluids likewise comprise a carrier fluid and, optionally, a surfactant similar to those described above in reference to ferrofluids.

In the method of the present invention, the magnetic fluid typically is a ferrofluid in an aqueous form. Suitable aqueous ferrofluids can include, for example, EMG 703 and EMG 304 both commercially available from Ferrotec (USA) Corporation.

In the case of the customizable mold surface used in the present invention, both the carrier fluid and the surfactant should be selected so as not to adversely affect the polymerization or, in the case of thermoplastic polymeric materials, the hardening of the fluid polymeric materials employed or ultimate properties of the polymeric article formed by the method.

The magnetic fluid is immiscible with the fluid polymeric material. That is, the magnetic fluid and the fluid polymeric material are incapable of forming a homogeneous mixture at any ratio of the two materials. This ensures that there is no intermixing of the two materials at the interface between the magnetic fluid and the fluid polymeric material.

The magnetic field can be provided either by use of a fixed magnet or by application of an electromagnetic field. The magnetic field may be removed prior to or subsequent to separating the two mold half-sections in (e) as mentioned above. The magnetic field applied can be controlled in accordance to digitized specific topographical/geometrical and shape information such that the magnetic fluids form the customized inner mold surface. Once the polymeric article has been demolded, the magnetic fluid can be recycled or reused in a subsequent casting process.

The method of the present invention may be used to prepare any of a myriad of molded polymeric articles including, for example, polymeric sheets, polymeric transparencies, such as windows, display screens, face shields, lenses, and aerospace transparencies.

Of course, the mold half-sections can be configured in any shape or geometry dependent upon the shape or geometry of the polymeric article to be obtained. Further, the two mold half-sections can comprise the same or different materials. In one embodiment, particularly suitable for the preparation of polymeric lenses, at least one of the mold half-sections is glass. It is contemplated that one of the mold half-sections can be a pre-formed lens while the inner surface of the opposing mold half-section receives application of the magnetic fluid. Additionally, the mold half-section which receives application of the magnetic fluid can possess a "cuplike" conformation; and the magnetic fluid is applied within the "cup" and subjected to the magnetic field to form the predetermined specific surface topography.

In a particular embodiment of the invention, the customized polymeric article is a lens, such as a plano (non-prescription) lens and an ophthalmic (prescription lens). In this case, the predetermined specific surface topography can constitute a predetermined optical power or shape specific to an individual lens wearer. The lens can have an outer surface having a topography conforming to an unmodified front mold half-section, and a back surface having a topography conforming to the predetermined specific surface topography of the magnetic fluid. The lenses produced by the method of the present invention can comprise plano lenses, single vision lenses, multifocal lenses, or gradient power lenses.

The fluid polymeric material can include any of the polymeric material compositions known in the plastics molding art. For example, non-limiting examples of the polymeric material compositions can include photopolymerizable materials (e.g., (meth)acrylate-based materials), thermosetting materials (e.g., polyurethanes, allyl functional carbonates, and epoxides), or thermoplastic materials (e.g., polycarbonates and poly(cyclo)olefins). The fluid polymeric material can be selected from the group consisting of polycarbonate, bisallyl carbonate, polyurethane, polyureaurethane, polythiourea urethane, epoxides, thioepoxides, cycloolefin (co)polymers, and (meth)acrylate-based materials. For purposes of this invention, the term "(meth)acrylate is intended to include both acrylate and methacrylate materials. The type of lens material utilized in the methods of the present invention is not critical to the invention.

Once the fluid polymeric material is inserted into the cavity between the two mold half-sections, the mold assembly containing the fluid polymeric material is subjected to conditions sufficient to effect at least partial polymerization (i.e., in the case of the photo-polymerizable or thermosetting polymeric materials) or hardening (i.e., in the case of thermoplastic polymeric materials) of the fluid polymeric material. The two mold half-sections are removed, thereby providing a polymeric article having at least one surface corresponding to the predetermined specific surface topography of the magnetic fluid.

It should be noted that, where the polymeric article is a lens, the predetermined surface topography can be adjusted to account for monomer deformation due to shrinkage and/or cure stress during curing/hardening in order to provide a predetermined optical power or shape specific to an individual wearer.

It is contemplated that the polymerization or hardening step can be carried out to the extent that the article thus formed is only partially polymerized/hardened (but polymerized/hardened to the extent that the topography and shape is maintained), and the remainder of the polymerization/hardening can be carried out after the article is removed from the mold.

Conditions suitable to effect polymerization or hardening of the fluid polymeric material can be accomplished by a variety of methods depending, of course, on the polymeric material compositions employed. For example, polymerization can be effectuated by subjecting the filled mold assembly to one or more of thermal conditions and actinic radiation, for a time sufficient to complete polymerization; and hardening of a thermoplastic material can be accomplished by subjecting the filled mold assembly to thermal conditions for a time sufficient to at least partially harden the thermoplastic polymeric material.

By way of example, in the method of the present invention, the one mold half-section can be a preformed front mold section which is attached to a back mold half-section, where the inner surface of the back mold half-section has been "customized" using the magnetic fluid in accordance with the method of the present invention. The back mold half-section could include a port for insertion or injection of the fluid polymeric material used to form the customized polymeric article. The two mold half-sections can be joined using any sealing methods known in the art, including gaskets and sealants. As previously mentioned, the magnetic field can be controllably applied to the magnetic fluid prior to or subsequent to insertion of the fluid polymeric material into the cavity between the two mold half-sections.

Further, the size and shape of the mold could be set in such a way that no post-processing (edging) would be necessary prior to inserting the finished product into eyeglass frames for the end user.

Whereas particular embodiments of this invention have been described above for purposes of illustration, it will be evident to those skilled in the art that numerous variations of the details of the present invention may be made without departing from the scope of the invention as defined in the appended claims.

Therefore, we claim:

1. A method for preparing a customized polymeric article comprising:
   (a) providing two mold half-sections, each half-section having an outer surface and an inner surface;
   (b) assembling the two mold half-sections to form a mold assembly such that the inner surfaces of the two mold half-sections oppose one another, thereby defining a cavity therebetween;
   (c) prior to or subsequent to (b) applying one or more magnetic fluids to the inner surface of at least one mold half-section;
   (d) inserting a fluid polymeric material into the cavity formed in (b);
   (e) prior to or subsequent to (d), controllably applying a magnetic field to the one or more magnetic fluids to form a customized reversible surface in accordance with a predetermined specific surface topography;
   (f) subjecting the mold assembly containing the fluid polymeric material to conditions sufficient to effect at least partial polymerization or hardening of the fluid polymeric material; and
   (g) separating the two mold half-sections to provide a polymeric article having at least one surface corresponding to the predetermined specific surface topography of the magnetic fluid,
   wherein the polymeric article is a lens and the predetermined specific topography constitutes a predetermined optical power or shape specific to an individual lens wearer.

2. The method of claim 1, wherein the magnetic field is removed prior to or subsequent to separating the two mold half-sections in (e).

3. The method of claim 1, wherein the magnetic fluid material is an aqueous ferrofluid.

4. The method of claim 1, wherein the magnetic fluid material is a perhalogenated ferrofluid.

5. The method of claim 1, wherein the magnetic fluid comprises a magnetorheological fluid.

6. The method of claim 1, wherein the magnetic fluid comprises cobalt-containing particles, nickel-containing particles, and/or alloys.

7. The method of claim 1, wherein the magnetic fluid material is immiscible with the fluid polymeric material when a magnetic field is applied to the mold assembly.

8. The method of claim 1, wherein at least one of the two mold half-sections is comprised of glass.

9. The method of claim 1, wherein the lens has an outer surface having a topography conforming to an unmodified front mold half-section, and a back surface having a topography conforming to the predetermined specific surface topography of the magnetic fluid.

10. The method of claim 1, wherein the lens comprises a plano lens, a single vision lens, a multifocal lens, or a gradient power lens.

11. The method of claim 1, wherein the fluid polymeric material is selected from the group consisting of photopolymerizable materials, thermosetting materials, and thermoplastic materials.

12. The method of claim 1, wherein the fluid polymeric material is selected from the group consisting of polycarbonate, bisallyl carbonate, polyurethane, polyureaurethane, polythioureaurethane, epoxides, thioepoxides, cycloolefin (co)polymers and (meth)acrylate-based materials.

13. The method of claim 11, wherein the fluid polymeric material comprises a thermosetting polymeric material which is partially polymerized in (f), and the method further comprises (h) subjecting the partially polymerized polymeric article to conditions sufficient to complete polymerization of the partially polymerized polymeric article.

14. The method of claim 11, wherein the fluid polymeric material comprises a thermoplastic polymeric material which is partially hardened in (f), and the method further comprises (h) subjecting the partially hardened polymeric article to conditions sufficient to complete hardening of the partially hardened polymeric article.

15. The method of claim 1, wherein the one or more magnetic fluids is/are applied to the inner surface of at least one mold half-section prior to (b).

16. The method of claim 1, wherein the one or more magnetic fluids is/are applied to the inner surface of at least one mold half-section subsequent to (b).

17. The method of claim 1, wherein the magnetic field is controllably applied to the one or more magnetic fluids to form a customized reversible surface in accordance with a predetermined specific surface topography prior to (d).

18. The method of claim 1, wherein the magnetic field is controllably applied to the one or more magnetic fluids to form a customized reversible surface in accordance with a predetermined specific surface topography subsequent to (d).

19. A lens prepared by the method of claim 1.

\* \* \* \* \*